(12) United States Patent
Kuzdeba et al.

(10) Patent No.: US 11,733,349 B2
(45) Date of Patent: Aug. 22, 2023

(54) REALTIME ELECTRONIC COUNTERMEASURE OPTIMIZATION

(71) Applicant: BAE SYSTEMS Information and Electronic Systems Integration Inc., Nashua, NH (US)

(72) Inventors: Scott A Kuzdeba, Hollis, NH (US); Brandon P. Hombs, Merrimack, NH (US); Peter J. Kajenski, Amherst, NH (US); Daniel Massar, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 221 days.

(21) Appl. No.: 16/953,568

(22) Filed: Nov. 20, 2020

(65) Prior Publication Data

US 2022/0163627 A1    May 26, 2022

(51) Int. Cl.
*G01S 7/36*   (2006.01)
*G01S 7/02*   (2006.01)

(52) U.S. Cl.
CPC ............... *G01S 7/36* (2013.01); *G01S 7/021* (2013.01)

(58) Field of Classification Search
CPC ... G01S 7/36; G01S 7/38; G01S 7/021; H04B 17/309; F41H 11/02
See application file for complete search history.

(56) References Cited

U.S. PATENT DOCUMENTS

| | | |
|---|---|---|
| 4,990,920 A | 2/1991 | Sanders, Jr. |
| 5,061,930 A | 10/1991 | Nathanson |

(Continued)

FOREIGN PATENT DOCUMENTS

| | | | |
|---|---|---|---|
| CN | 110109059 A | 8/2019 | |
| CN | 111366899 A * | 7/2020 | ............... G01S 7/36 |
| EP | 1291667 A2 | 3/2003 | |

OTHER PUBLICATIONS

CN 111366899 AMT.pdf-DES, machine translation of CN-111366899-A (Year: 2020).*

(Continued)

*Primary Examiner* — Erin F Heard
*Assistant Examiner* — Kenneth W Good
(74) *Attorney, Agent, or Firm* — Maine Cernota & Rardin; Gary McFaline

(57) ABSTRACT

A method of selecting and optimizing a countermeasure for application against a novel, ambiguous, or unresponsive radar threat includes selecting a candidate countermeasure and an initial parameter set and varying at least one of the parameters while the effectiveness of the candidate countermeasure against the radar threat is assessed, for example by a human observer. Embodiments include repeating the process with additional candidate countermeasures. For an unresponsive radar threat, a previously effective countermeasure can be selected as the candidate countermeasure. For an ambiguous radar threat, at least one countermeasure previously verified as effective against a partially matching known threat can be selected as the candidate countermeasure. Correlated parameters can be simultaneously varied. An optimization surface and trajectory formed by a plurality of correlated parameters can be identified by machine intelligence, used to guide the parameter variations, and/or stored for use against the same or similar threats in the future.

18 Claims, 4 Drawing Sheets

(56) References Cited

U.S. PATENT DOCUMENTS

| | | | |
|---|---|---|---|
| 5,150,122 A | | 9/1992 | Bell |
| 5,287,110 A | * | 2/1994 | Tran .................. G01S 7/38 342/16 |
| 5,448,243 A | | 9/1995 | Behtke |
| 5,457,460 A | * | 10/1995 | Tran .................. G01S 7/36 342/16 |
| 5,574,458 A | | 11/1996 | Tran |
| 5,606,500 A | | 2/1997 | Tran |
| 6,181,744 B1 | * | 1/2001 | Antonaitis ............. G01S 7/021 348/E5.073 |
| 7,068,209 B2 | | 6/2006 | Gounalis |
| 7,737,883 B2 | * | 6/2010 | Dark ................. H04K 3/45 342/13 |
| 7,830,297 B1 | | 11/2010 | Wang |
| 8,082,832 B1 | * | 12/2011 | Tidwell ................. H04B 10/25 89/1.8 |
| 8,587,468 B2 | | 11/2013 | Card |
| 9,322,907 B1 | | 4/2016 | Kadambe |
| 9,519,049 B1 | | 12/2016 | Kadambe |
| 10,281,570 B2 | | 5/2019 | Parker |
| 10,365,348 B2 | | 7/2019 | Markel |
| 10,630,712 B2 | | 4/2020 | Amor |
| 10,800,392 B2 | | 10/2020 | Alam |
| 10,907,940 B1 | * | 2/2021 | Parker .................. G06N 20/00 |
| 10,908,252 B2 | | 2/2021 | Grandin |
| 11,181,346 B1 | * | 11/2021 | Barfoot ............. F41G 7/2246 |
| 2003/0085831 A1 | | 5/2003 | Lavoie |
| 2009/0224956 A1 | | 9/2009 | Dark |
| 2010/0253567 A1 | | 10/2010 | Factor |
| 2011/0148699 A1 | * | 6/2011 | Anderson .............. G01S 19/46 342/357.31 |
| 2016/0238694 A1 | * | 8/2016 | Kishigami ............. G01S 7/023 |
| 2017/0160379 A1 | * | 6/2017 | Markel .................. G01S 7/38 |
| 2017/0192089 A1 | | 7/2017 | Parker |
| 2018/0146003 A1 | | 5/2018 | Amor |
| 2018/0297573 A1 | | 10/2018 | Alam |
| 2019/0080187 A1 | | 3/2019 | Inoue |
| 2019/0162818 A1 | | 5/2019 | Grandin |
| 2019/0342331 A1 | | 11/2019 | Schetina |
| 2020/0166607 A1 | | 5/2020 | Jolly |
| 2020/0278419 A1 | | 9/2020 | Borosak |
| 2020/0334961 A1 | | 10/2020 | Kaindl |
| 2020/0371201 A1 | | 11/2020 | Labudec, Jr. |

OTHER PUBLICATIONS

Office Action for U.S. Appl. No. 16/953,562 dated Aug. 23, 2022, 32 pages.

Office Action for U.S. Appl. No. 16/953,659 dated Jun. 30, 2022, 36 pages.

Classification, Denoising, and Deinterleaving of Pulse Streams with Recurrent Neural Networks by Zhang-Meng Liu published by IEEEAug. 2019 (Year: 2019).

Office Action for U.S. Appl. No. 16/953,562 dated Apr. 29, 2022, 22 pages.

Office Action for U.S. Appl. No. 16/953,579 dated Jun. 7, 2022, 37 pages.

Final Office Action for U.S. Appl. No. 16/953,659 dated Nov. 4, 2022, 32 pages.

Advisory Action for U.S. Appl. No. 16/953,562 dated Nov. 4, 2022, 3 pages.

Final Office Action for U.S. Appl. No. 16/953,579 dated Oct. 26, 2022, 53 pages.

Office Action for U.S. Appl. No. 16/953,562, dated Dec. 7, 2022, 30 pages.

Advisory Action for U.S. Appl. No. 16/953,659 dated Jan. 18, 2023, 11 pages.

Office Action for U.S. Appl. No. 16/953,959 dated Feb. 27, 2023, 32 pages.

A. Erdogan and K. George, "Deinterleaving Radar Pulse Train Using Neural Networks," 2019 IEEE International Conference on Computational Science and Engineering (CSE) and IEEE International Conference on Embedded and Ubiquitous Computing (EUC), New York, NY, USA, 2019, pp. 141-147, doi: 10.1109/CSE/EUC. 2019.00036.

P. Louridas and C. Ebert, "Machine Learning," in IEEE Software, vol. 33, No. 5, pp. 110-115, Sep.-Oct. 2016, doi: 10.1109/MS.2016. 114.

\* cited by examiner

REALTIME ELECTRONIC COUNTERMEASURE OPTIMIZATION

STATEMENT OF GOVERNMENT INTEREST

Portions of the present invention may have been made pursuant to United States Defense Advanced Research Projects Agency (DARPA) Contract Number HR0011-13-C-0029, and there may be certain rights to the United States Government.

RELATED APPLICATIONS

This application is related to U.S. applications Ser. No. 16/953,562, Ser. No. 16/953,579, and Ser. No. 16/953,659, all of which were filed on Nov. 20, 2020. All of these applications are herein incorporated by reference in their entirety for all purposes.

FIELD

The disclosure relates to countermeasures against wireless electronic threats, and more particularly to electronic countermeasures against hostile radars.

BACKGROUND

Most of the electronic warfare (EW) countermeasure systems that are currently deployed against radar threats implement an electronic countermeasure (ECM) strategy whereby a detected waveform that is transmitted by a hostile radar is compared to a threat database, i.e. a database of known hostile RF waveforms, so as to match the detected waveform with a known hostile RF waveform and thereby identify the radar threat as being a of a known type and having known behavior and waveform characteristics. The identity of the detected radar is then used to select an appropriate countermeasure strategy and associated parameter settings (if any) from a library of predetermined and pre-verified countermeasures. The selected countermeasure is then applied as specified to mitigate the threat.

This existing approach to electronic warfare relies upon an assumption that hostile radars will almost always be of a known type, will implement previously observed waveforms and other behaviors, and will not be able to mitigate the applied countermeasure. However, the validity of these assumptions is increasingly being called into question.

Wireless electronic threats such as hostile radar systems are rapidly evolving from primarily analog systems having RF waveforms and other characteristics that are fixed, or at least limited and predictable in scope, to mainly digital systems having waveforms and other characteristics that are software controlled and programmable, such that their waveforms and other threat characteristics can be easily and quickly changed. As a result of this evolution to primarily digital systems, hostile radar threats are becoming increasingly "agile," in that they are able to flexibly alter their waveforms and other behaviors, which can render known hostile radar sources more difficult to identify and to disrupt.

Future hostile radar systems will likely be able to sense their environment and adapt their waveforms to maximize performance and automatically attempt to mitigate any detected countermeasures. As a result, the real-time effectiveness of an electronic countermeasure against a known hostile radar threat can no longer be assumed, even if the electronic countermeasure has been previously validated for effectiveness against the known hostile radar threat.

As a result, friendly assets that encounter a novel radar threat could be forced either to withdraw, to proceed without applying a countermeasure, or to attempt to apply a countermeasure to the novel radar threat that has previously only been validated for effectiveness against a different, known threat, in the hopes that it may have some effect against the novel threat. As used herein the term "asset" refers to any person or object that is of value and may require protection from hostile threats. For example, an asset can be a fixed or mobile air, land, maritime or space-based vehicle. Some examples include tanks, personnel carriers, helicopters, UAV, planes and ships.

Furthermore, as radar threats become increasingly digital and agile, it can no longer be assumed that a majority of the radar threats that are encountered in battle will be of known types emitting known RF waveforms. As a result, friendly assets that encounter a novel radar threat could be forced either to withdraw, to proceed without applying a countermeasure, or to attempt to apply a countermeasure to the novel radar threat that has previously only been validated for effectiveness against a different known threat, in the hopes that it may have some effect against the novel threat.

What is needed, therefore, is a system and method for reliably disrupting a radar threat that is either an unidentified or ambiguous radar threat, or is identified as a known radar threat but is not being sufficiently disrupted by a previously validated countermeasure.

SUMMARY

The present disclosure is a system and method for reliably disrupting a radar threat that is either an unidentified or ambiguous radar threat, or is identified as a known radar threat but is not being sufficiently disrupted by a previously validated countermeasure.

Definitions of Terms

For ease of expression, and unless otherwise required by context, the following terms and their obvious variants are used herein with the following meanings, unless otherwise required by context:

The terms "hostile radar" and "radar threat" are used herein to refer to any hostile threat that emits electromagnetic radiation and is subject to countermeasures. The term "imminent" radar threat is used herein to refer to a radar threat that poses a current danger to an asset, and the term "imminent" RF waveform refers to an RF waveform that is being emitted by an imminent radar threat.

The terms "countermeasure" and "electronic countermeasure" or "ECM" refer to any action that can be applied against a hostile radar in an attempt to "disrupt" the hostile radar, i.e. to mitigate the threat posed by the hostile radar. The "effectiveness" of an applied countermeasure refers to a degree to which the applied countermeasure is able to "mitigate" the hostile threat, i.e., reduce the threat posed by the hostile radar to an asset. An "effective" countermeasure refers to a countermeasure that meets defined effectiveness criteria by reducing the threat posed by a hostile radar to an acceptable degree. An example of a defined effectiveness criterion could be a requirement that a projectile or missile that is guided by the radar threat is caused to miss its intended target by a defined distance. Another example might be a requirement that a radar threat that changes its behavior when a target is detected, for example by continuing to direct its RF emissions toward the target, is caused by an applied countermeasure to return to a behavior that is typical when a target has not been detected, such as continuously varying the direction in which it emits RF.

The terms "radio frequency" and "RF" are used herein to refer to electromagnetic radiation emitted at any frequency.

The terms "waveform" and "RF waveform" are used herein to refer to all of the fixed and time-varying features that characterize the RF that is emitted by a hostile radar. Examples of features that can characterize an RF waveform include, but are not limited to, static features such as geographic distribution patterns of the emitted RF, number and selection of RF frequencies, and number and relative selections of RF phases, as well as time dependent features such as RF phase variation patterns, RF frequency variation patterns, such as frequency "hopping" patterns, and RF amplitude variation patterns, such as duty factors, timing, and shaping of pulses and/or other amplitude modulations. All time dependent patterns of changes in an RF waveform, i.e. "behaviors" of the RF waveform, are also considered to be features. As such, the term "features" is not limited herein to static features, but is used to refer to both static characteristics and dynamic behaviors of an RF waveform. An RF waveform is always associated with a specific radar. However, it is sometimes convenient to characterize a specific radar as emitting more than one RF waveform, either simultaneously or at different times.

The terms "known" RF waveform and "known" radar threat are used herein to refer to an RF waveform and associated radar threat that have been previously encountered and characterized, and that are included in an available "threat database." It is generally assumed that for each known radar threat included in a threat database there is at least one known countermeasure recorded in a countermeasure library that has been previously verified to be effective against the known radar threat.

If most or all of the features of an imminent RF waveform are similar or identical to corresponding features of a known RF waveform recorded in a threat database, then the RF waveforms are said to "match," and the known radar threat is said to "match" the imminent radar threat. An imminent RF waveform that matches a known RF waveform included in an available threat database is also referred to as a "known" RF waveform," and an immanent radar threat that is emitting a known RF waveform and is disrupted by a corresponding pre-verified countermeasure is referred to herein as a "known" threat or "known" radar threat.

The term "novel" RF waveform refers to a detected RF waveform having features that do not substantially match a set of features of any known RF waveform. Similarly, the terms "novel" radar threat, "novel" radar and "novel" threat all refer to a radar threat that is emitting a novel RF waveform.

The term "ambiguous" RF waveform refers to an imminent RF waveform that at least partially matches a plurality of known RF waveforms, thereby resulting in an ambiguity as to whether the imminent RF waveform is a match to any of the known RF waveforms, or if the imminent RF waveform is a novel RF waveform that coincidentally has features that overlap with features of the plurality of known RF waveforms. The terms ambiguous threat, ambiguous radar threat, and ambiguous hostile radar all refer to a radar threat that is emitting at least one ambiguous RF waveform.

The terms "unresponsive" radar and "unresponsive" radar threat are used to refer to a radar threat that is emitting a known RF waveform, but against which a countermeasure that was previously verified as being effective against the radar threat is no longer sufficiently effective. The term "unresponsive" RF waveform is used to refer to an RF waveform emitted by an unresponsive radar threat.

The terms "defined" countermeasure and "defined" ECM refer to an electronic countermeasure that is included in a library of available countermeasures and is associated with at least one parameter that must be set or "populated" before the countermeasure is applied. Said parameters are referred to as countermeasure or ECM parameters and/or as the parameters or parameter set of the countermeasure or ECM. A countermeasure in combination with an associated parameter set in which all of the parameters have been specified is referred to herein as a "populated" countermeasure. A given defined countermeasure, when populated by different sets of ECM parameters, may be effective against different known and/or unknown threats.

The term "known" countermeasure refers to a defined countermeasure that has been populated with a corresponding set of ECM parameters (if any), where the defined countermeasure and associated parameter set are both included in an available countermeasure library, and wherein the known countermeasure has been previously verified to be effective against at least one known threat.

According to the disclosed system and method, upon encountering a novel, ambiguous, or unresponsive imminent radar threat, at least one defined countermeasure is selected from an available countermeasure library and populated with a set of initial parameters to create a candidate countermeasure. The candidate countermeasure is then applied to the radar threat, and the effectiveness of the candidate countermeasure is assessed in real time. Depending on the embodiment, the assessment can be made by a human observer according to specified criteria, or for example using the method of co-pending U.S. application Ser. No. 16/953,579, also by the present Applicant, which is incorporated herein in its entirety by reference for all purposes. At least one of the initial parameters is then varied, and the effectiveness of the candidate countermeasure is reassessed. This process of varying parameters of the applied countermeasure and assessing the effectiveness of the candidate countermeasure is continued, until a parameter set is found that renders the candidate countermeasure effective against the imminent radar threat, or until it is determined that the candidate countermeasure cannot be rendered effective against the imminent radar threat, at which point, in embodiments, another defined countermeasure is selected and populated as a candidate countermeasure, and the process is repeated.

Embodiments further include applying more than one candidate countermeasures, in turn or simultaneously, as a composite countermeasure against an imminent radar threat, wherein the parameters of one or more of the candidate countermeasures are varied and the effectiveness of the combined, composite countermeasure is assessed.

Once an applied electronic countermeasure (ECM) has been assessed in real time and determined to be effective in disrupting a novel or unresponsive hostile radar threat, it may be expedient to continue applying the effective countermeasure until the imminent threat has been avoided, or until a mission has been completed. In other circumstances, it may be possible to continue to apply candidate ECM's and combinations thereof, and to vary the applied parameters, until a "most effective" defined countermeasure and associated parameter set have been identified. This may be the case, for example, if incremental changes of parameters and/or substitution of similar defined countermeasures result in incremental changes in the behavior of the RF waveform emitted by an imminent radar threat.

Upon identification of an effective countermeasure and associated parameter set, some embodiments further include adding the countermeasure and the associated, optimized parameters to a countermeasure library.

According to embodiments of the present disclosure, if an unresponsive imminent radar threat is encountered, i.e. a radar threat that appears to be a known threat, but does not appear to be sufficiently disrupted by a previously verified, known countermeasure, then the defined countermeasure and associated parameter set that were previously known to be effective against the unresponsive threat can be selected as a candidate countermeasure, and the applied parameters can be varied to determine whether a modified parameter set can render the countermeasure effective against the imminent radar threat.

Similarly, if an ambiguous imminent radar threat is encountered, i.e. an imminent radar threat emitting an RF waveform that at least partially matches a plurality of known RF waveforms, then the defined countermeasures and associated parameter sets that have been previously verified as being effective against each of the partially matched known RF waveforms can be selected as candidate countermeasures for application and optimization against the imminent radar threat.

If a novel, ambiguous, or unresponsive imminent radar threat is encountered, selecting one or more candidate defined countermeasures from the countermeasure library can include the method of co-pending U.S. application Ser. No. 16/953,562, also by the present Applicant, which is incorporated herein in its entirety by reference in its entirety for all purposes. In embodiments, selected defined countermeasures can be populated with "default" parameter sets for initial application thereof. In some embodiments, the initial parameter sets are selected from among parameter sets included in the library of countermeasures.

In embodiments, the initial parameter sets can be selected or generated by a machine intelligence that has been pre-trained for example using one or more existing threat databases and libraries of associated countermeasures. In particular, if a candidate defined countermeasure is known to have been effective against a plurality of hostile radar threats when populated with different parameter sets, i.e. a plurality of parameter sets are associated with application of the defined countermeasure against different known threats, then a trained artificial intelligence can be used to synthesize a new parameter set from the known parameter sets according to a comparison of features of the RF waveform emitted by the imminent radar threat and corresponding features of RF waveforms emitted by the known threats against which the candidate countermeasure was previously known to be effective. The newly synthesized parameter set can then be used as the initial parameter set for the candidate ECM.

A first general aspect of the present disclosure is a method of protecting an asset from an imminent radar threat that is emitting at least one hostile radio frequency (RF) waveform and poses an imminent threat to the asset, the imminent radar threat being a novel, ambiguous, or unresponsive radar threat. The method includes the following steps:

A) selecting a defined countermeasure from a countermeasure library;
B) determining an initial parameter set comprising at least one parameter and populating the countermeasure with the initial parameter set by populating all of the parameters in the parameter set, thereby creating a candidate countermeasure;
C) applying the candidate countermeasure against the imminent radar threat;
D) assessing an effectiveness of the applied countermeasure against the imminent radar threat;
E) if defined effectiveness criteria are not met by the applied countermeasure, varying at least one of the parameters;
F) repeating steps C) through E) until the defined effectiveness criteria are met, or until it is determined that the effectiveness of the applied countermeasure against the imminent radar threat cannot be further increased; and
G) if the defined effectiveness criteria are met, designating the candidate countermeasure as an effective countermeasure against the imminent radar threat.

In embodiments, step C is performed by a human observer according to defined criteria.

Any of the above embodiments can further include, if the assessed effectiveness is maximized but the defined effectiveness criteria are not met, repeating steps A) through F).

Any of the above embodiments can further include, if the candidate countermeasure is an effective countermeasure against the imminent radar threat, continuing to apply the effective countermeasure to the imminent radar threat until the imminent radar threat no longer poses a danger to the asset.

Any of the above embodiments can further include, if the candidate countermeasure is an effective countermeasure against the imminent radar threat, continuing to repeat steps C) through E) until a most effective countermeasure is identified.

In any of the above embodiments, in step B) determining the initial parameter set can include selecting from the countermeasure library a parameter set that is associated in the countermeasure library with the candidate countermeasure.

In any of the above embodiments, if the imminent radar threat is an unresponsive radar threat, in that it is a known radar threat but is unresponsive to a pre-verified defined countermeasure populated by pre-verified parameters that was previously verified as effective against the known radar threat, the method can further include in steps A) and B) selecting as the defined countermeasure and initial parameter set the pre-verified countermeasure and pre-verified parameters.

In any of the above embodiments, if the imminent radar threat is an ambiguous radar threat, in that there is a match or partial match between the imminent radar threat and a plurality of known radar threats included in at least one threat database, the method can further include in steps A) and B) selecting as the defined countermeasure and initial parameter set a defined countermeasure and parameters that were previously verified as effective against at least one of the known radar threats.

In any of the above embodiments, the effectiveness criteria can include a requirement that the effectiveness of the applied, populated countermeasure is greater than a pre-defined minimum effectiveness.

In any of the above embodiments, the effectiveness criteria can include a requirement that a parameter set that provides an effectiveness maximum has been identified.

In any of the above embodiments, in step E) varying at least one of the parameters with which the candidate countermeasure is populated can include simultaneously varying a plurality of the parameters with which the candidate countermeasure is populated.

In any of the above embodiments, the plurality of parameters that are simultaneously varied can belong to a group of correlated parameters, and the simultaneous variation of the plurality of parameters can include identifying an optimization trajectory arising from the correlations between the plurality of parameters. In some of these embodiments, identifying the optimization trajectory is at least assisted by a machine intelligence. In some of these embodiments, simultaneously varying the plurality of parameters includes referring to a previously determined mapping of the correlations between the plurality of parameters. And in any of these embodiments, the method can further include storing information regarding the optimization trajectory in a database.

In any of the above embodiments, in step F), repeating steps C) through E) can include varying a first parameter in step E) until the assessed effectiveness reaches a first maximum, and then varying a second parameter in step E) until the assessed effectiveness reaches a second maximum that is greater than the first maximum.

In any of the above embodiments, in step E) varying the at least one parameter can include correlating changes in the at least one of the parameters with resultant changes in the RF waveforms emitted by the imminent radar threat Any of the above embodiments can further include, if in step G) the candidate countermeasure is an effective countermeasure against the imminent radar threat, storing information regarding the radar threat in at least one threat database and/or storing information regarding the effective countermeasure in at least one countermeasure library.

A second general aspect of the present disclosure is an apparatus for protecting an asset from an imminent radar threat that is emitting a hostile radio frequency (RF) waveform and poses an imminent threat to the asset. The apparatus includes an antenna configured to receive the hostile RF waveform, a receiver configured to amplify and digitize the hostile RF waveform, a signal analyzer configured to isolate the hostile RF waveform, a countermeasure library containing known countermeasures that are pre-verified as effective against associated known radar threats, and a Cognitive Electronic Warfare System (CEW) configured to:
A) select a defined countermeasure from the countermeasure library;
B) populate the selected defined countermeasure with an initial parameter set comprising at least one parameter to create a candidate countermeasure;
C) apply the candidate countermeasure against the imminent radar threat;
D) assess an effectiveness of the applied countermeasure against the imminent radar threat;
E) if defined effectiveness criteria are not met by the applied countermeasure, vary at least one of the parameters;
F) repeat steps C) through E) until the defined effectiveness criteria are met, or until the assessed effectiveness is maximized; and
G) if the defined effectiveness criteria are met, designate the candidate countermeasure as an effective countermeasure against the imminent radar threat.

In embodiments, the signal analyzer is further configured to use data-driven machine learning to separate and isolate the hostile RF waveform from other signals received by the antenna.

In any of the above embodiments, the signal analyzer can be further configured to use data-driven machine learning in step B) to select or generate the initial parameter set.

In any of the above embodiments, the apparatus can further include a threat database, and a waveform identifier configured to compare the hostile RF waveform with known RF waveforms stored in the threat database, and to determine if the radar threat is known, unknown, or ambiguous.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
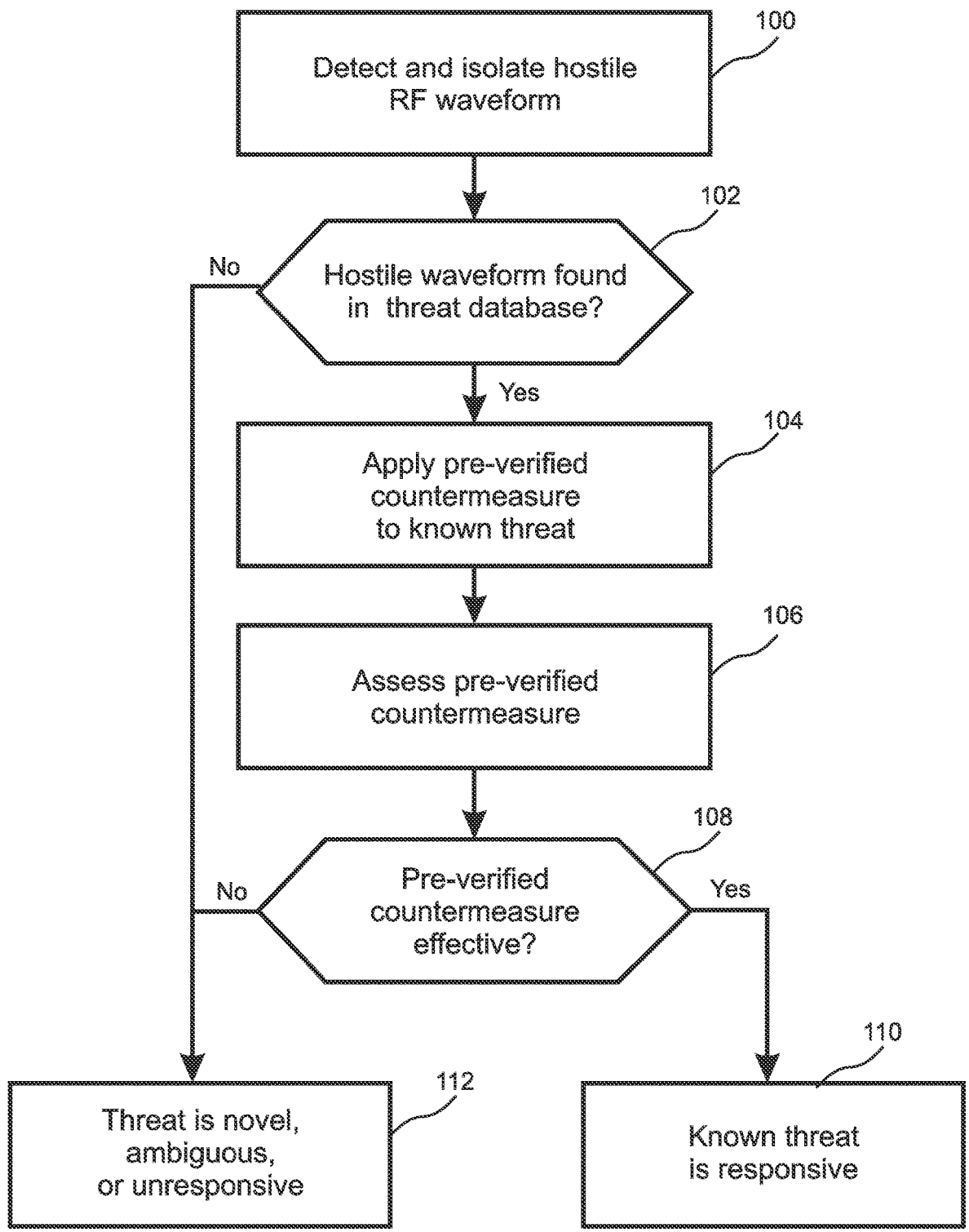
FIG. 1 is a flow diagram that illustrates determining whether an imminent radar threat is a novel radar threat, an ambiguous radar threat, an unresponsive radar threat, or a known radar threat, according to an embodiment of the method of the present disclosure.

The present disclosure is a system and method for reliably disrupting a radar threat that is either an unidentified or ambiguous radar threat or is identified as a known radar threat but is not being sufficiently disrupted by a previously validated countermeasure With reference to FIG. 1, upon encountering an imminent radar threat, embodiments detect and isolate at least one RF waveform 100 that is being emitted by the imminent radar threat. Features of the detected RF waveform are then compared with features of known RF waveforms included in at least one available threat database. If a known radar threat is not found in an available threat database that matches the imminent radar threat 102, then the imminent radar threat is designated as a novel threat 112. Similarly, if the imminent radar threat appears to at least partially match a plurality of known radar threats, such that a unique identification of the imminent radar threat is not possible, then the imminent radar threat is designated as an ambiguous threat 112.

If a known threat is found in an available threat database that uniquely matches the imminent radar threat 102, then a corresponding electronic countermeasure (ECM) that has been pre-verified as being effective against the known threat is retrieved from an available countermeasure library and applied to the imminent radar threat 104. The effectiveness of the applied countermeasure is then assessed in real time 106 as it is applied. If the assessment indicates that the pre-verified countermeasure is effective against the known radar threat 108, then the known radar threat is considered to be responsive to the pre-verified countermeasure 110. On the other hand, if the assessment indicates that the pre-verified countermeasure is not effective against the imminent radar threat 108, then the imminent radar threat is designated as being unresponsive to the pre-verified countermeasure 112.

In other embodiments, comparison with a threat library is not included as part of the disclosed method. Instead, all detected hostile RF waveforms are considered to be novel RF waveforms, and the associated imminent radar threats are considered to be novel radar threats.

Figure 2A:
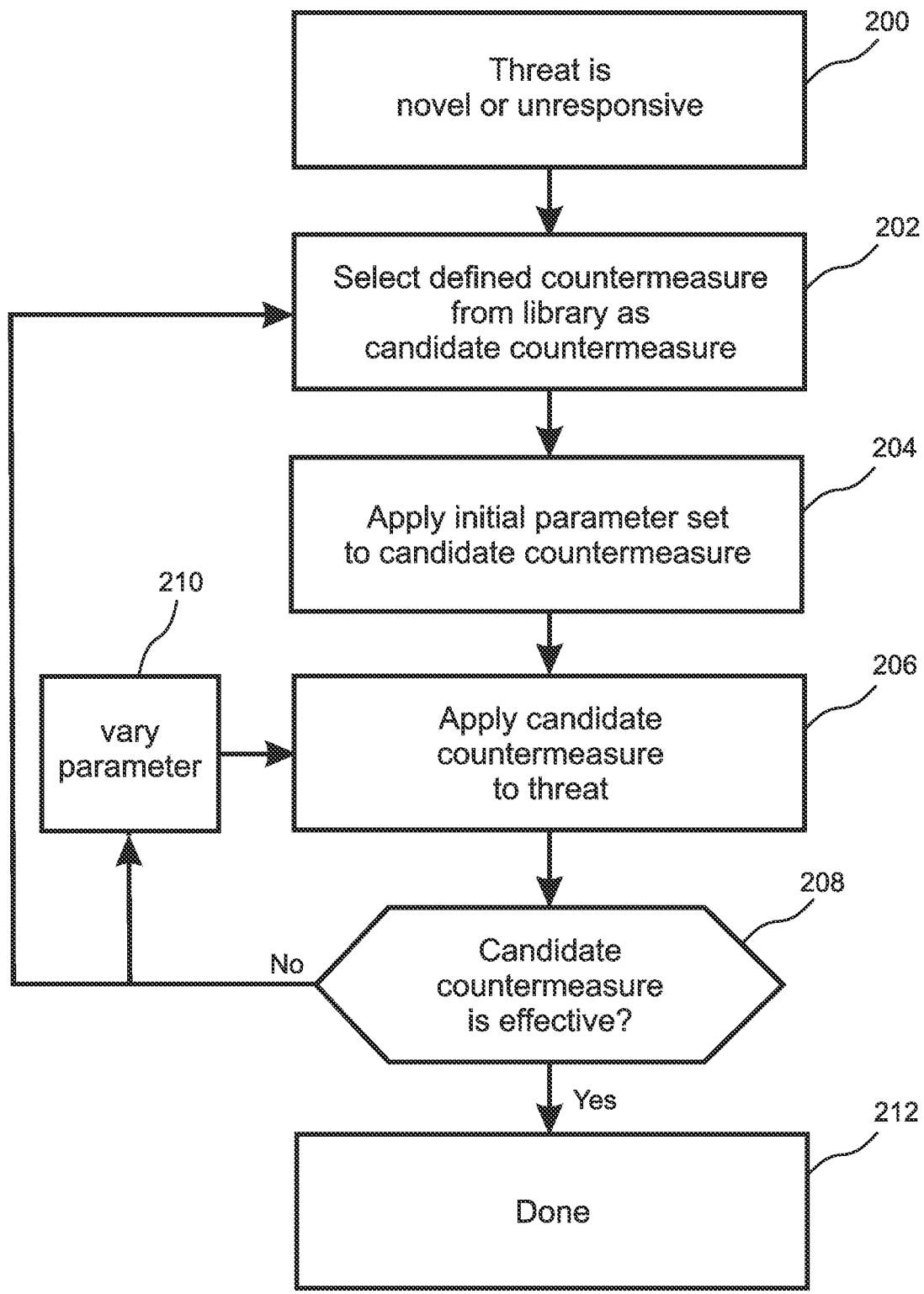
FIG. 2A is a flow diagram that illustrates selecting, applying, and optimizing candidate countermeasures according to an embodiment of the present disclosure.

With reference to FIG. 2A, according to embodiments of the disclosed system and method, upon encountering a novel, ambiguous, or unresponsive radar threat 200 at least one defined countermeasure is selected from a library of electronic countermeasures 202 and populated with an initial parameter set 204 to create a candidate countermeasure. The candidate countermeasure is then applied to the radar threat 206, and the effectiveness of the candidate countermeasure is assessed in real time 208 for example by an observer using defined criteria, or using the method of co-pending U.S. application Ser. No. 16/953,579, also by the present Applicant, which is incorporated herein in its entirety by reference for all purposes. If the assessment of the applied countermeasure 208 indicates that the candidate countermeasure and parameters are not sufficiently effective against the threat, then at least one of the initial parameters is then varied 210, the countermeasure is re-applied to the threat as populated with the revised parameters 206, and the effectiveness of the candidate countermeasure is reassessed 208.

This process of varying parameters of the applied countermeasure 210, re-applying the countermeasure to the threat 206, and re-assessing the effectiveness of the candidate countermeasure 208 is continued, until a parameter set is found that renders the candidate countermeasure effective 212, or until it is determined that there is no parameter set that will render the candidate countermeasure effective against the imminent radar threat. In embodiments, if no combination of parameters is found that renders the candidate countermeasure effective against the imminent radar threat, then another defined countermeasure is selected 202 and populated 204 to provide another candidate countermeasure, and the process is repeated 206, 208, 210, until a defined countermeasure and parameters are identified 212 that are effective against the radar threat.

Embodiments further include selecting and populating more than one defined countermeasure to provide a plurality of candidate countermeasures, and applying the plurality of candidate countermeasures, in turn or simultaneously, as a composite countermeasure to the hostile radar, wherein the parameters of one or more of the candidate countermeasures are varied and the effectiveness of the combined, composite countermeasure is assessed.

Once an applied candidate electronic countermeasure (ECM) has been assessed in real time to be effective in disrupting a novel, ambiguous, or unresponsive imminent radar threat 212, it may be expedient to continue applying the effective countermeasure without further parameter variation until the imminent threat has been avoided or a mission has been completed. This may be true, in particular, when the results of parameter variations are difficult to predict. In other circumstances, for example when variation of at least one parameter results in continuous and incremental changes in the effectiveness of the candidate ECM, it may be prudent to continue to vary parameters 210, apply the candidate countermeasure to the threat with the varied parameters 206, and reassess the countermeasure 208, and even to select different, possibly similar defined countermeasures 202 and repeat the process 204, 206, 208, 210 until the most effective defined countermeasure and associated parameter set have been identified.

Figure 2B:
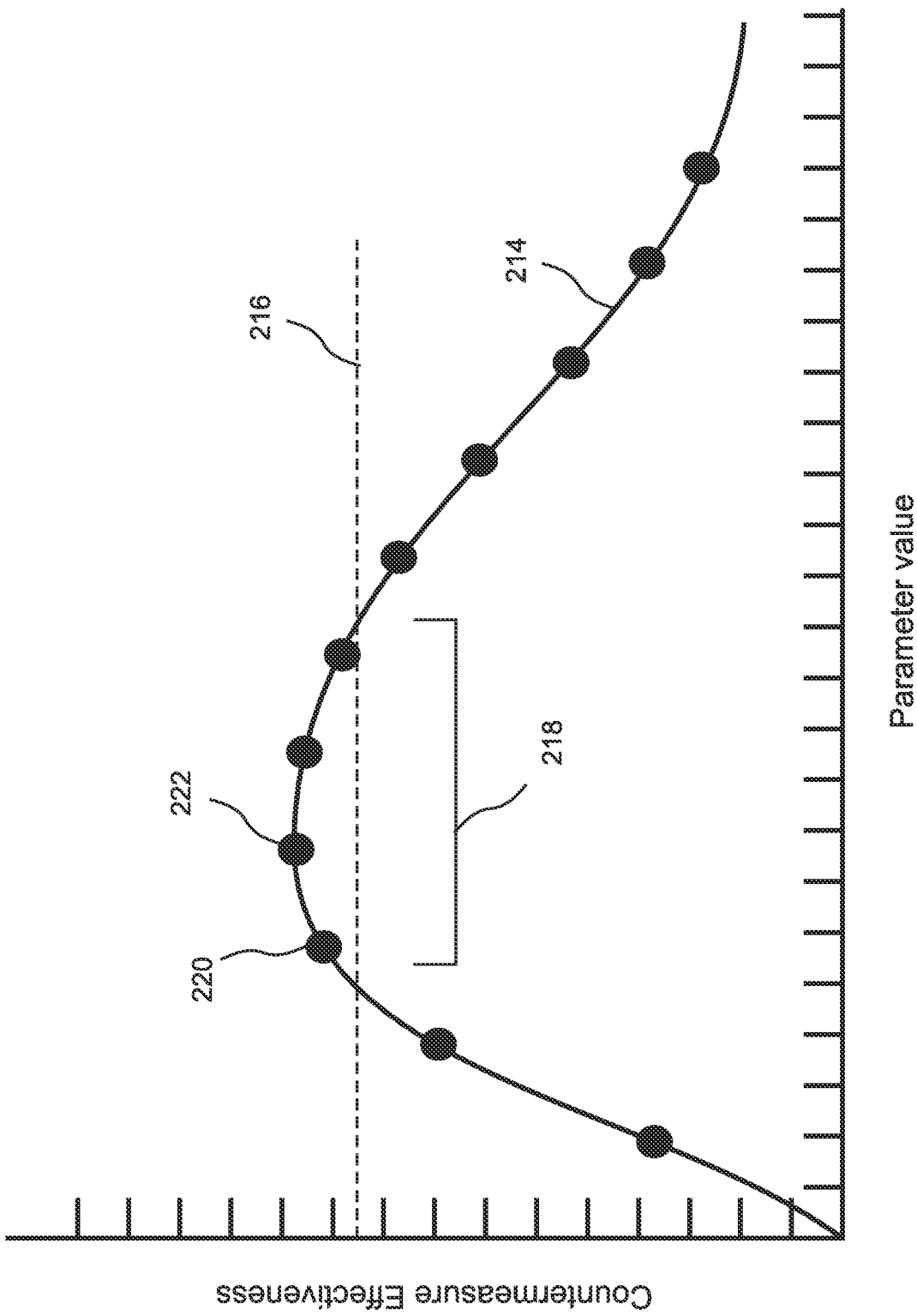
FIG. 2B is a graph that presents a hypothetical example of changes in the effectiveness of a candidate countermeasure as a parameter of the countermeasure is varied.

For example, in FIG. 2B a hypothetical curve 214 that characterizes the effectiveness (in arbitrary units) of a hypothetical candidate countermeasure is presented as a function of the value (also in arbitrary units) of a parameter with which the candidate countermeasure is populated. The parameter that is varied could be, for example, an RF frequency at which a jamming signal is transmitted, an RF pulsing rate, or almost any other parameter that might be associated with a countermeasure. The black, solid circles on the curve indicate actual effectiveness values that have been determined by assessing the effectiveness of the candidate countermeasure as the hypothetical parameter is varied from one value to the next. The dashed line 216 indicates a minimum effectiveness that is considered to be acceptable for protection of an asset that is otherwise endangered by a radar threat.

In the hypothetical example of FIG. 2B, there is a range 218 of parameter values over which the candidate countermeasure is "sufficiently" effective against the threat. Under some circumstances, it might be expedient to stop varying the parameter immediately upon identifying a parameter value 220 for which the candidate countermeasure meets the minimum requirement 216 for effectiveness against the radar threat. In other circumstances, especially when incremental changes in the parameter value result in incremental changes in the effectiveness of the candidate countermeasure, as is the case in the example of FIG. 2B, it may be prudent to continue to vary the parameter until a maximum 222 in the effectiveness is identified.

It should be noted that parameters need not be varied in equal increments, that a plurality of parameters may be simultaneously varied, and that embodiments sometimes vary one or more parameters in decreasing increments near an effectiveness maximum 222, so as to accurately determine the most effective value.

In general, when a defined countermeasure is selected and populated with a plurality of parameters, the parameters may include groups of mutually inter-dependent, "non-orthogonal" parameters that form a multi-dimensional "optimization surface" of parameters, such that optimal values for the parameters can be most efficiently found by varying the members of the group simultaneously according to an "optimization trajectory" along the optimization surface Embodiments store information regarding previously identified optimization surfaces and trajectories of known radar threats in a countermeasure library and/or in another database, so that they can be retrieved and used on future occasions to improve the efficiency of parameter optimization when the same defined countermeasure, or a similar defined countermeasure, is selected as a candidate to be applied against another, possibly similar radar threat.

For example, during a subsequent encounter with a similar radar threat, optimal regions of a previously identified and stored optimization surface can provide guidance according to reinforcement learning as to the best selection of initial parameters and the most efficient optimization trajectories for varying and optimizing the parameters, even if the RF waveform emitted by the newly encountered radar threat is not identical to the RF waveform that was emitted by the previously encountered radar threat. The result can be the determination of a mapping between radar threat waveforms and optimal parameters and optimization trajectories, whereby RF waveforms having certain observable characteristics are identified as being highly correlated with the optimization of specific parameters, both in terms of selecting which parameters to vary, and selecting the amplitudes and/or optimization trajectories of the variations.

The parameters of a candidate defined countermeasure may also include mutually orthogonal parameters or groups of parameters that can be varied and optimized independently. As such, the simple example of FIG. 2B can also apply to some embodiments even when the effectiveness maximum 222 is below the minimum effectiveness 216. This is because it can still be valuable to determine the maximum effectiveness value for a given orthogonal parameter or group of parameters before proceeding to vary another orthogonal parameter or group of parameters, and to continue this process in turn until all orthogonal parameters and orthogonal groups of parameters have been varied and their maximum effectiveness values identified. Similarly, embodiments store information regarding effects on radar threat behavior that result from individual parameter variations and/or variations along parameter optimization trajectories, and the stored information is used to guide choices of parameters and optimization trajectories in subsequent application of the same and/or similar candidate defined countermeasures.

Once an effective countermeasure and associated parameter set have been identified, some embodiments further include adding the countermeasure and the associated, optimized parameters, and in embodiments also information regarding relevant optimization surfaces and trajectories, to a library of known countermeasures.

According to embodiments of the present disclosure, if an unresponsive imminent radar threat is encountered, i.e. a radar threat that appears to be a known threat, but does not appear to be sufficiently disrupted by a previously verified, known countermeasure, then the defined countermeasure and associated parameter set that were previously known to be effective against the unresponsive threat can be selected as a candidate countermeasure, and the parameters can be varied to determine whether a modified parameter set can render the defined countermeasure effective against the imminent radar threat.

Similarly, if an ambiguous imminent radar threat is encountered, i.e. an imminent radar threat emitting an RF waveform that at least partially matches a plurality of known RF waveforms, then the defined countermeasures and associated parameter sets that have been previously verified as being effective against each of the partially matched known RF waveforms can be selected as candidate countermeasures for application and optimization against the imminent radar threat.

If a novel imminent radar threat is encountered, then the selection of one or more defined countermeasures from the countermeasure library can be based, for example, on the method of co-pending U.S. application Ser. No. 16/953,562, also by the present Applicant, which is incorporated herein in its entirety by reference for all purposes. In embodiments, the selected, defined countermeasures are populated with "default" parameter sets for initial application thereof. In some embodiments, the initial or default parameter sets are selected from among parameter sets included in the library of countermeasures.

In embodiments, a trained artificial intelligence can be used to select or generate an initial parameter set for a candidate defined countermeasure, and/or to select an optimization trajectory for varying the selected parameters. In particular, if a candidate defined countermeasure is known to have been effective against a plurality of hostile radar threats when populated with different parameter sets, i.e. a plurality of parameter sets are associated with application of the defined countermeasure against different known threats, then a trained artificial intelligence can be used to synthesize a new parameter set from the known parameter sets according to a comparison of features of the RF waveform emitted by the imminent radar threat and corresponding features of RF waveforms emitted by the known threats against which the candidate countermeasure was previously known to be effective. The newly synthesized parameter set can then be used as the initial parameter set for the candidate ECM.

Figure 3:
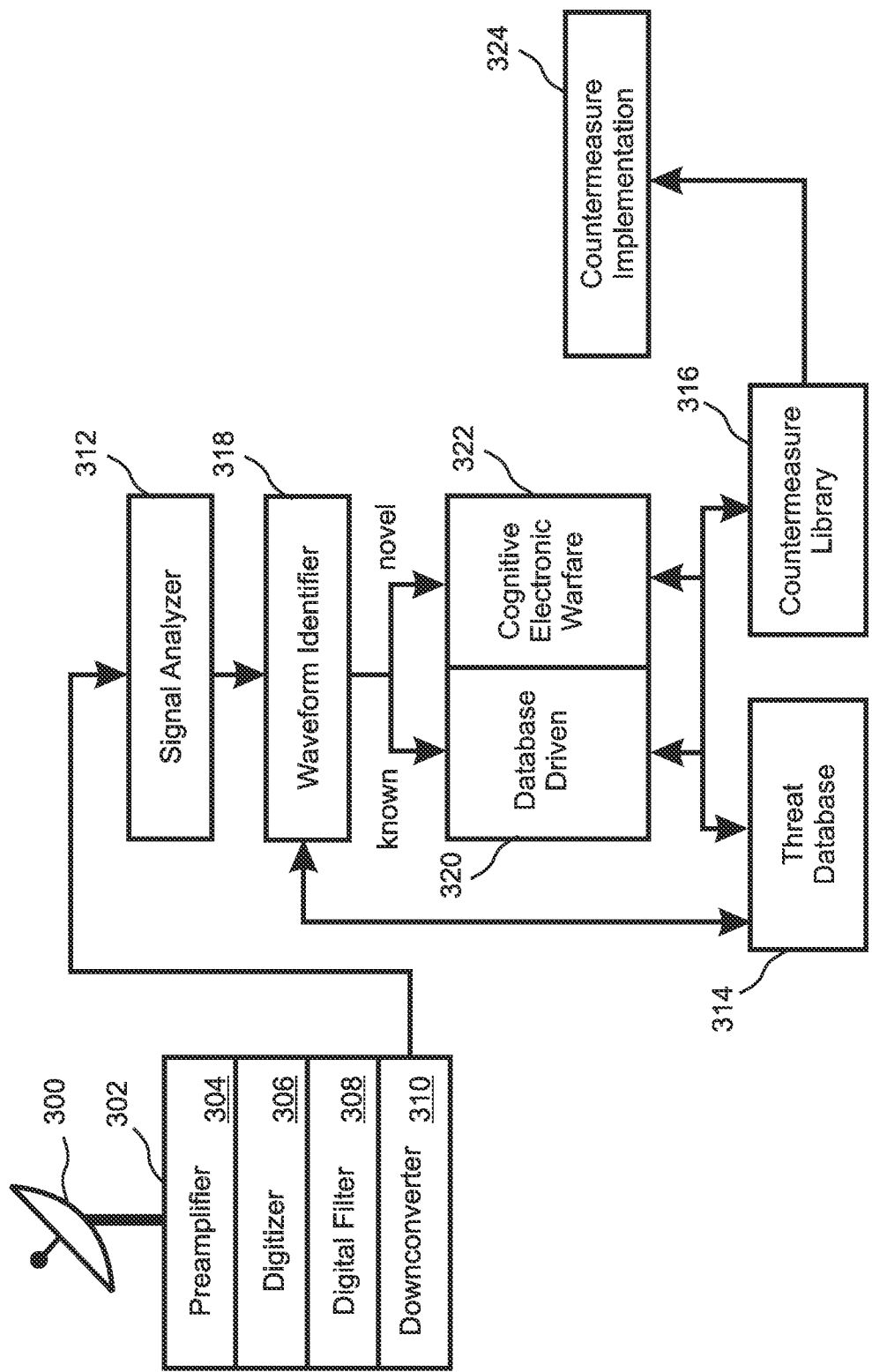
FIG. 3 is a block diagram that illustrates an apparatus embodiment of the present disclosure.

With reference to FIG. 3, in embodiments the disclosed system includes an antenna 300 that captures wireless RF signals and directs them to receiver electronics 302 that may include a preamplifier 304 and digitizer 306, as well as a digital filter 308 and a digital downconverter 310 configured to eliminate the carrier frequency of the detected RF and to convert the detected RF to baseband. Embodiments of the present system further include a Signal Analyzer 312 that uses data-driven machine learning to separate (de-interleave) and isolate from each other the hostile radar-emitted waveforms that are present in the RF environment, and, in embodiments, associates each of the hostile waveforms with the hostile radar from which it is being emitted. In embodiments, data-driven machine learning, such as self-guided clustering, is used to de-interleave the waveforms, determine the features that characterize each of the waveforms, and in some embodiments to classify each of the hostile waveforms as to the inferred mode and intent of the associated radar according to its features and behavior.

The system further includes at least one countermeasure library 316, and in embodiments also at least one threat database 314 in which characterizing features of known threat waveforms are stored together with links between the known threat waveforms and associated defined and known countermeasures contained in the countermeasure library 316 that were previously verified to be effective against the threats that emit the known threat waveforms. In embodiments, the threat database 314 also includes settings and/or parameters associated with each of the threat waveforms with which an associated defined countermeasure is to be populated.

In embodiments, a waveform identifier 318 compares detected waveforms that are isolated by the Signal Analyzer 312 with the known hostile waveforms that are contained in the threat database 314, and identifies each of the detected waveforms as either a known, ambiguous, or novel hostile waveform that is a candidate for application of a countermeasure, or as non-hostile waveform that is not a candidate for application of a countermeasure. If a detected waveform is uniquely matched with a hostile waveform found in the threat database 314 and is therefore a known hostile waveform, then in embodiments a database driven warfare system 320 selects a defined or known countermeasure from the countermeasure library 316 according to the links between the known threats and countermeasures. The selected countermeasure is then forwarded to appropriate countermeasure implementation systems 324 for population with appropriate parameters and implementation against the radar threat. A Cognitive Electronic Warfare (CEW) system 322 assesses whether or not the applied countermeasure is effective. If not, then the known threat is re-classified as an unresponsive threat, and is treated as if it were a novel threat.

Upon encountering a novel, ambiguous, or unresponsive threat, the CEW 322 in embodiments selects at least one defined countermeasure from the countermeasure library 316 as a candidate countermeasure. The candidate countermeasure is then populated with an initial parameter set and applied against the radar threat 324, and its effectiveness is assessed by the CEW 322. As is described above, parameters of the candidate countermeasure are varied, and the effectiveness of the candidate countermeasure is re-assessed by the CEW 322. If necessary, additional candidate countermeasures are applied against the radar threat 324, and their effectiveness is assessed and reassessed by the CEW 322 as the associated parameters are varied. In embodiments, at least one composite countermeasure is constructed from a plurality of candidate countermeasures and assessed as its parameters are varied. This process continues at least until an effective countermeasure is identified. In embodiments, the previously unknown threat is added to the threat database 314, and the effective countermeasure and known parameters are added to the countermeasure library 316 and associated with the previously unknown threat in the threat database 314.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications without departing from the spirit thereof. The disclosure presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

We claim:

1. An apparatus for protecting an asset from an imminent radar threat that is emitting a hostile radio frequency (RF) waveform and poses an imminent threat to the asset, the apparatus comprising:
   an antenna configured to receive the hostile RF waveform;
   a receiver configured to amplify and digitize the hostile RF waveform;
   a signal analyzer configured to isolate the hostile RF waveform;
   a countermeasure library containing known countermeasures that are pre-verified as effective against associated known radar threats; and
   a Cognitive Electronic Warfare System (CEW) configured to:
      A) select a defined countermeasure from the countermeasure library;
      B) populate the selected defined countermeasure with an initial parameter set comprising at least one parameter to create a candidate countermeasure;
      C) apply the candidate countermeasure against the imminent radar threat;
      D) assess an effectiveness of the applied countermeasure against the imminent radar threat;
      E) if defined effectiveness criteria are not met by the applied countermeasure, vary at least one of the parameters, wherein varying the at least one of the parameters includes correlating changes in the at least one of the parameters with resultant changes in the RF waveforms emitted by the imminent radar threat;
      F) repeat steps C) through E) until the defined effectiveness criteria are met, or until the assessed effectiveness is maximized; and
      G) if the defined effectiveness criteria are met, designate the candidate countermeasure as an effective countermeasure against the imminent radar threat.

2. The apparatus of claim 1, wherein the signal analyzer is further configured to use data-driven machine learning to separate and isolate the hostile RF waveform from other signals received by the antenna.

3. The apparatus of claim 1, wherein the signal analyzer is further configured to use data-driven machine learning in step B) to select or generate the initial parameter set.

4. The apparatus of claim 1, wherein the apparatus further comprises:
   a threat database; and a waveform identifier configured to compare the hostile RF waveform with known RF waveforms stored in the threat database, and to determine if the radar threat is known, unknown, or ambiguous.

5. The apparatus of claim 1, further comprising repeating steps A) through F) when the assessed effectiveness is maximized but the defined effectiveness criteria are not met.

6. The apparatus of claim 1, further comprising, when the candidate countermeasure is an effective countermeasure against the imminent radar threat, continuing to apply the effective countermeasure to the imminent radar threat until the imminent radar threat no longer poses a danger to the asset.

7. The apparatus of claim 1, further comprising continuing to repeat steps C) through E) until a most effective countermeasure is identified when the candidate countermeasure is an effective countermeasure against the imminent radar threat.

8. The apparatus of claim 1, wherein in step B) determining the initial parameter set includes selecting from the countermeasure library a parameter set that is associated in the countermeasure library with the candidate countermeasure.

9. The apparatus of claim 1, wherein if the imminent radar threat is an unresponsive radar threat, in that it is a known radar threat but is unresponsive to a pre-verified defined countermeasure populated by pre-verified parameters that was previously verified as effective against the known radar threat, the CEW is further configured to select as the defined countermeasure and initial parameter set the pre-verified countermeasure and pre-verified parameters in steps A) and B).

10. The apparatus of claim 1, wherein if the imminent radar threat is an ambiguous radar threat, in that there is a match or partial match between the imminent radar threat and a plurality of known radar threats included in at least one threat database, the CEW is further configured to, in steps A) and B), select as the defined countermeasure and initial parameter set a defined countermeasure and parameters that were previously verified as effective against at least one of the known radar threats.

11. The apparatus of claim 1, wherein the effectiveness criteria include a requirement that the effectiveness of the applied, populated countermeasure is greater than a predefined minimum effectiveness.

12. The apparatus of claim 1, wherein the effectiveness criteria include a requirement that a parameter set that provides an effectiveness maximum has been identified.

13. The apparatus of claim 1, wherein in step E) varying at least one of the parameters with which the candidate countermeasure is populated includes simultaneously varying a plurality of the parameters with which the candidate countermeasure is populated.

14. The apparatus of claim 13, wherein the plurality of parameters that are simultaneously varied belong to a group of correlated parameters, and wherein the simultaneous variation of the plurality of parameters includes identifying an optimization trajectory arising from the correlations between the plurality of parameters.

15. The apparatus of claim 14, wherein simultaneously varying the plurality of parameters includes referring to a previously determined mapping of the correlations between the plurality of parameters.

16. The apparatus of claim 14, wherein the CEW is further configured to store information regarding the optimization trajectory in a database.

17. The apparatus of claim 1, wherein, in step F), repeating steps C) through E) includes varying a first parameter in step E) until the assessed effectiveness reaches a first maximum, and then varying a second parameter in step E) until the assessed effectiveness reaches a second maximum that is greater than the first maximum.

18. The apparatus of claim 1, further comprising if in step G) the candidate countermeasure is an effective countermeasure against the imminent radar threat, storing information regarding the radar threat in at least one threat database and/or storing information regarding the effective countermeasure in at least one countermeasure library.

* * * * *